United States Patent
Saitoh (10) Patent No.: US 7,168,861 B2
(45) Date of Patent: Jan. 30, 2007

(54) OPTICAL FIBER CONNECTOR CORD AND OPTICAL COUPLING SET INCLUDING THE OPTICAL FIBER CONNECTOR CORD

(75) Inventor: Tatsuhiko Saitoh, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 51 days.

(21) Appl. No.: 11/079,340

(22) Filed: Mar. 15, 2005

(65) Prior Publication Data

US 2005/0238297 A1    Oct. 27, 2005

(30) Foreign Application Priority Data

Apr. 21, 2004    (JP)    ............... 2004-126053

(51) Int. Cl.
    *G02B 6/36*    (2006.01)
(52) U.S. Cl. ............... 385/87; 385/84; 385/139; 385/77; 385/78; 385/62; 385/70; 385/69; 385/60
(58) Field of Classification Search ............... 385/53, 385/56, 60, 70, 72, 76, 77, 78, 81, 62, 139, 385/84, 87, 79, 69
See application file for complete search history.

(56) References Cited

U.S. PATENT DOCUMENTS

| | | | |
|---|---|---|---|
| 5,224,189 A * | 6/1993 | Maas et al. ............... | 385/98 |
| 6,910,910 B2 * | 6/2005 | Cairns ............... | 439/352 |
| 6,954,574 B1 * | 10/2005 | Russell et al. ............... | 385/125 |
| 2006/0062533 A1 * | 3/2006 | Hachiwaka et al. ........ | 385/125 |

FOREIGN PATENT DOCUMENTS

| | | | | |
|---|---|---|---|---|
| JP | 57-198406 | 12/1982 | ............... | 385/53 X |
| JP | 60-194411 | 10/1985 | ............... | 385/53 X |
| JP | 2004-4320 | 1/2004 | ............... | 385/53 X |

OTHER PUBLICATIONS

Ouzounov, Dimitre G., et al. "Generation of Megawatt Optical Solitons in Hollow-Core Photonic Band-Gap Fibers," Science, Sep. 19, 2003, vol. 301, www.sciencemag.org pp. 1702-1704.
Japanese Office Action issued in corresponding Japanese Patent Application No. 2004-126053, Dated Aug. 1, 2006.

* cited by examiner

*Primary Examiner*—Brian M. Healy
(74) *Attorney, Agent, or Firm*—McDermott Will & Emery LLP (57) ABSTRACT

A optical fiber connector cord capable of being detachably attached to a receptacle fixed to an optical apparatus includes an optical fiber having at least one hole which extends along an optical axis, a plug having a fiber hole through which the optical fiber extends and which is capable of being fitted into the receptacle, a first sealing member which is provided on an outer peripheral surface of the plug and which seals a gap between the plug and the receptacle along the outer periphery of the plug, and a second sealing member which seals a gap between an inner surface of the plug's fiber hole and the optical fiber along the outer periphery of the optical fiber, so that holes in the optical fiber are effectively prevented from communicating with the atmosphere. In addition, an optical coupling set includes the optical fiber connector cord and the receptacle.

9 Claims, 9 Drawing Sheets

OPTICAL FIBER CONNECTOR CORD AND OPTICAL COUPLING SET INCLUDING THE OPTICAL FIBER CONNECTOR CORD

BACKGROUND OF THE INVENTION

1. Field of the Invention

The present invention relates to an optical fiber cord having connectors, and also to an optical coupling set including such an optical fiber cord.

2. Description of the Background Art

Recently, optical fibers (holey fibers) having multiple holes along optical axes thereof have been developed. In a typical holey fiber, light is confined in the core region by means of difference in effective refractive index between the core region and the cladding region as generated by plurality of holes, or by means of a photonic band gap generated by a photonic crystal structure. In such a holey fiber, bending loss is smaller as compared to a conventional optical fiber and various dispersion characteristics can be obtained.

A technique of changing optical transmission characteristics by filling the holes of a holey fiber with Xenon (Xe) gas has been disclosed by Dimitre G. Ouzounov (eight others) in "Generation of Megawatt Optical Solutions in Hollow-Core Photonic Band-Gap Fibers", Science, Sep. 19, 2003, Vol. 301, pp. 1702–1704.

Holey fibers are disadvantageous in that loss increases if there are impurities in the holes. Accordingly, a method of preventing impurities from entering the holes by fusing both ends of the fiber and sealing the openings of the holes in the manufacturing process of the fiber has been proposed. However, in this method, ambient gas or the atmosphere in which the fiber material is drawn will be trapped in the holes, which results in increase of absorption loss of light in 2.76-μm and 1.38-μm bands, the light being absorbed by water vapor, or increase of absorption loss of vacuum ultraviolet light which is absorbed by oxygen molecules. Therefore, the holes are preferably evacuated to vacuum or filled with a gas that does not absorb light to be guided. In addition, since holey fibers are attached to various optical apparatuses, the ends thereof are preferably configured to be detachable. Although Dimitre G. Ouzounov et. al. suggest filling the holes with Xe gas, neither a method for filling the holes nor a structure for encapsulating the Xe gas is described.

SUMMARY OF THE INVENTION

An object of the present invention is to provide an optical fiber cord having connectors (hereinafter referred to as "optical fiber connector cord") in which holes in an optical fiber are prevented from communicating with the atmosphere and which can be detachably fixed to an optical apparatus easily, and to provide an optical coupling set including the optical fiber connector cord.

In order to achieve the above-described object, according to one aspect of the present invention, an optical fiber connector cord includes an optical fiber having at least one hole which extends along an optical axis thereof, a plug detachably fixable into a receptacle fixed to an optical apparatus, the plug having a fiber hole through which the optical fiber extends; a first sealing member provided on the outer peripheral surface of the plug so as to seal a gap between the plug and the receptacle along an outer circumference of the plug; and a second sealing member for sealing a gap between an inner surface of the plug's fiber hole and the optical fiber along an outer circumference of the optical fiber.

According to another aspect of the present invention, provided is an optical coupling set including a receptacle fixed to an optical apparatus, an optical fiber having at least one hole which extends along an optical axis, a plug having a fiber hole through which the optical fiber extends and being fittable into the receptacle, a first sealing member provided on the outer peripheral surface of the plug so as to seal a gap between the plug and the receptacle along an outer circumference of the plug; and a second sealing member for sealing a gap along an outer circumference of the optical fiber between the inner surface of the plug's fiber hole and the optical fiber.

Advantages of the present invention will become apparent from the following detailed description, which illustrates the best mode contemplated to carry out the invention. The invention is capable of other and different embodiments, the details of which are capable of modifications in various obvious respects, all without departing from the invention. Accordingly, the accompanying drawings and descriptions are illustrative in nature, not restrictive.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION OF THE INVENTION

Embodiments

Figure 1:
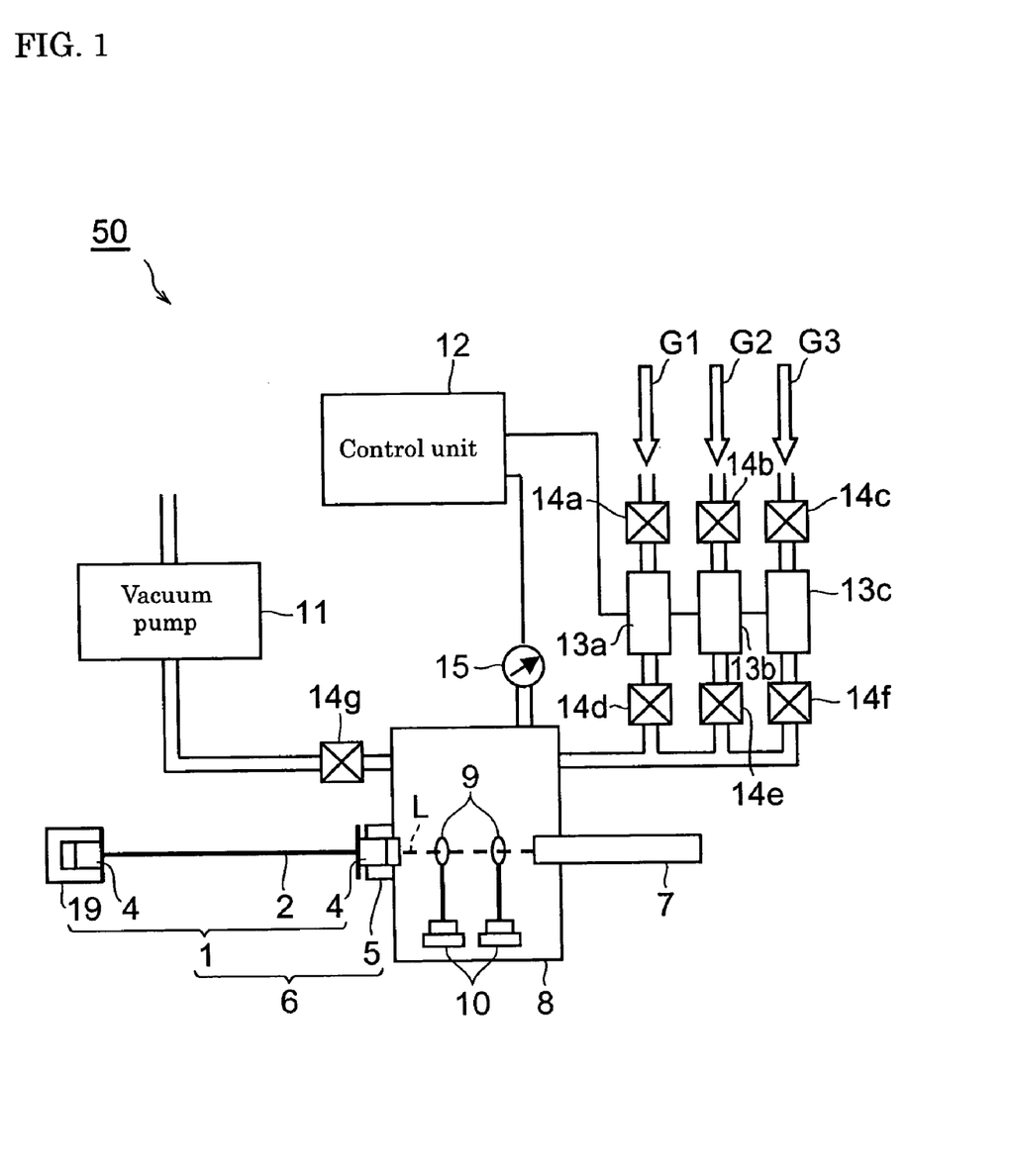
FIG. 1 is a schematic diagram illustrating an optical fiber cord having connectors and an optical coupling set according to an embodiment of the present invention.

FIG. 1 is a schematic diagram illustrating an optical fiber cord having connectors and an optical coupling set according to an embodiment of the present invention. The optical coupling set 6 according to the present embodiment includes the optical fiber connector cord 1 and a receptacle 5 which can be detachably connected to each other. The receptacle 5 is fixed to an optical apparatus 50 which includes a light source 7, a chamber 8, a vacuum pump 11, a control unit 12, and flow/pressure controllers 13a to 13c.

The optical fiber connector cord 1 is constructed by attaching a plug 4 to each end of an optical fiber 2. The optical fiber 2 is a so-called holey fiber having a hole that extends along an optical axis. The plug 4 attached to one end (first end) of the optical fiber 2 is covered with a protective cover 19, and the hole formed in the optical fiber 2 are sealed with the protective cover 19 at the first end. The plug 4 attached to the other end (second end) of the optical fiber 2 is fitted to the receptacle 5 fixed to the chamber 8, and is thereby fixed to the chamber 8.

The light source 7 is, for example, a laser device, and is fixed to the chamber 8. A light-emitting end of the light source 7 is optically coupled to the second end of the optical fiber 2 in the chamber 8. A pair of lenses 9 are disposed between the light-emitting end of the light source 7 and the second end of the optical fiber 2. One of the lenses 9 collimates a laser beam L from the light source 7 and the other lens 9 converges the collimated laser beam L toward the second end of the optical fiber 2. The lenses 9 are preferably fixed to an XY stage 10 so that the positions thereof can be adjusted by controlling the XY stage 10. The XY stage 10 may also be placed outside the chamber 8.

The vacuum pump 11 is connected to the chamber 8 with a pipe having an open-close switchable valve 14g, and discharges gas from the chamber 8.

The flow/pressure controllers 13a to 13c are used for adjusting the flow and pressure of three kinds of gasses G1 to G3 when the gasses G1 to G3 are injected into the chamber 8. The flow/pressure controllers 13a to 13c are connected to the chamber 8 with pipes having open-close switchable valves 14d to 14f, respectively, at one end thereof. In addition, the flow/pressure controllers 13a to 13c are also connected to inlets for the gasses G1 to G3 with pipes having open-close switchable valves 14a to 14c, respectively, at the other end thereof. The gasses G1 to G3 may be, for example, inert gas such as nitrogen gas, argon gas, neon gas, krypton gas, xenon gas, and helium gas, which do not absorb light.

The control unit 12 is used for controlling the flow/pressure controllers 13a to 13c. The control unit 12 controls the flow/pressure controllers 13a to 13c on the basis of a pressure value indicated by a pressure gauge 15 which measures the pressure in the chamber 8, and thereby adjusts the flow and pressure of each of the gasses G1 to G3 which flow through the flow/pressure controllers 13a to 13c, respectively.

The operation of the optical coupling set 6 and the optical apparatus 50 structured as above will be described below. First, one of the plugs 4 of the optical fiber connector cord 1 is inserted and fitted into the receptacle 5 of the chamber 8. Then, gas in the chamber 8 (the atmosphere including water vapor and oxygen) is drawn out by the vacuum pump 11 so that the chamber 8 and the holes in the optical fiber 2 are evacuated to vacuum. The laser beam L is then emitted from the light source 7 and enters an end face of the optical fiber 2 via the lenses 9. The laser beam L propagates through the optical fiber 2. The plug 4 at the end opposite from the receptacle 5 may also be connected to an optical apparatus having a structure similar to that of the optical apparatus 50 except that the light source 7 is replaced by a light-receiving component.

Alternatively, the optical coupling set 6 and the optical apparatus 50 may also be operated as below. That is, after the chamber 8 and the holes in the optical fiber 2 are evacuated to vacuum with the vacuum pump 11, at least one of the gasses G1 to G3 is injected into the chamber 8. At this time, the flow and pressure of the gasses G1 to G3 are adjusted by the flow/pressure controllers 13a to 13c, respectively. Thus, the contents of the chamber 8 and the holes in the optical fiber 2 are replaced by at least one of the gasses G1 to G3. If the optical fiber 2 is not sealed at the first end thereof, the pressure in the chamber 8 is maintained at a positive pressure to allow the gasses G1 to G3 to flow toward the first end of the optical fiber 2. Then, the laser beam L is emitted from the light source 7 and enters the end face of the optical fiber 2 via the lenses 9. The laser beam L propagates through the optical fiber 2.

Figure 2A:
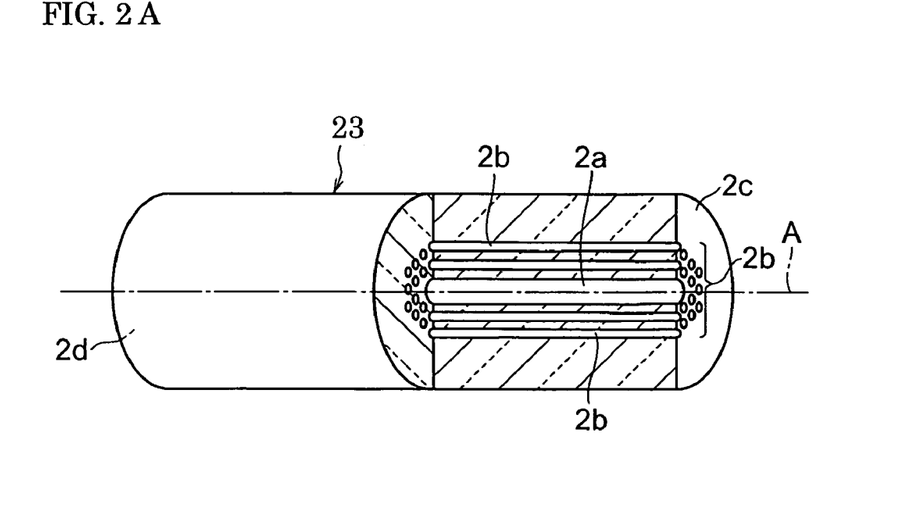
FIG. 2A is a partially cutout perspective view showing an example of an optical fiber.

FIG. 2A is a partially cutout perspective view showing an example of the optical fiber 2. An optical fiber 23 shown in FIG. 2A is called a photonic band gap fiber. With reference to FIG. 2A, the optical fiber 23 is made of fibrous glass and has an end face 2c at one end and an end face 2d at the other end. In addition, the optical fiber 23 has a single hole 2a on a central axis (optical axis) of the optical fiber 23 and multiple holes 2b around the hole 2a. The hole 2a extends along the optical fiber 23 from the end face 2c to the end face 2d along the optical axis, and the holes 2b also extend through the optical fiber 23 from the end face 2c to the end face 2d along the optical axis.

The holes 2b are arranged in a pattern and at intervals such that a photonic crystal structure is obtained in a cross section perpendicular to the optical axis of the optical fiber 23. Accordingly, a photonic band gap, which is a forbidden band gap of light, is formed around the hole 2a and the laser beam L is trapped in the hole 2a and a peripheral region of the hole 2a. More specifically, the holes 2b function as a cladding, and therefore the laser beam L which enters the optical fiber 2 mainly propagates though the hole 2a.

Figure 2B:
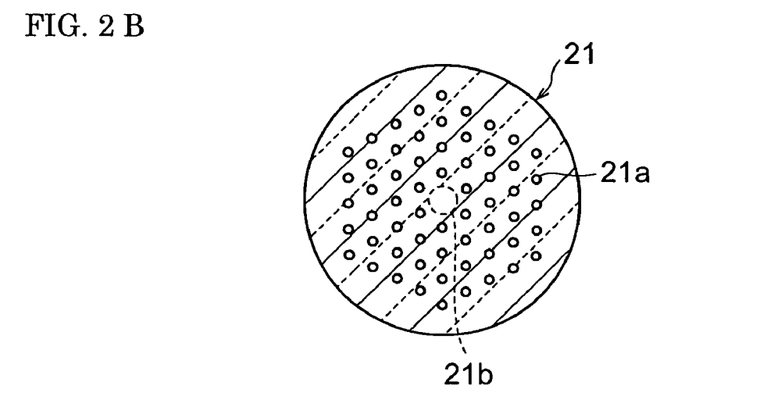
FIG. 2B is a sectional view showing another example of an optical fiber.

FIG. 2B is a sectional view showing another example of the optical fiber 2. An optical fiber 21 shown in FIG. 2B is called a photonic crystal fiber. With reference to FIG. 2B, the optical fiber 21 has multiple holes 21a. The holes 21a extend through the optical fiber 21 along an optical axis thereof, and are regularly arranged around a central region 21b of the optical fiber 21. Accordingly, the holes 21a effectively function as a cladding, and therefore the laser beam L which enters the optical fiber 21 propagates through the central region 21b surrounded by the holes 21a.

In the above-described optical fiber 23, light propagates through a hollow section. Therefore, light having a wavelength that cannot be guided by a conventional optical fiber due to absorption by glass can also be guided. In the optical fiber 21, the difference in refractive index between a region corresponding to a core and a region corresponding to a cladding can be designed to be considerably larger than in the known optical fibers, and accordingly the bending loss can be reduced. In addition, since the holes 21a can be arranged arbitrarily, various dispersion characteristics can be obtained. The optical fiber 21 may also have a concentric periodic refractive index structure in place of the holes 21a.

Figure 2C:
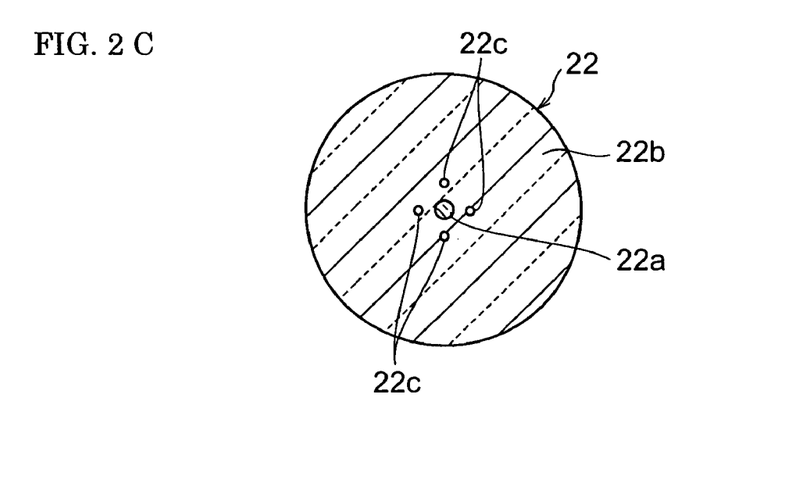
FIG. 2C is a sectional view showing another example of an optical fiber.

FIG. 2C is a sectional view showing another example of the optical fiber 2. An optical fiber 22 shown in FIG. 2C is called a Hole-Assisted Lightguide Fiber (HALF). With reference to FIG. 2C, the optical fiber 22 includes a core 22a and a cladding 22b which covers the core 22a. The refractive index of the core 22a is set higher than that of the cladding 22b. The optical fiber 22 has multiple holes 22c in the cladding 22b. The holes 22c extend along an optical axis in the optical fiber 22. In addition, the holes 22c are positioned around the core 22a, and four holes 22c, for example, are provided as shown in FIG. 2C. In this optical fiber 22, the laser beam L which has entered the optical fiber 22 propagates through the core 22a mainly because of the difference in refractive index between the core 22a and the cladding

22b, and accordingly dispersion characteristics which cannot be obtained with a conventional optical fiber can be attained and the bending loss can be reduced.

Figure 3:
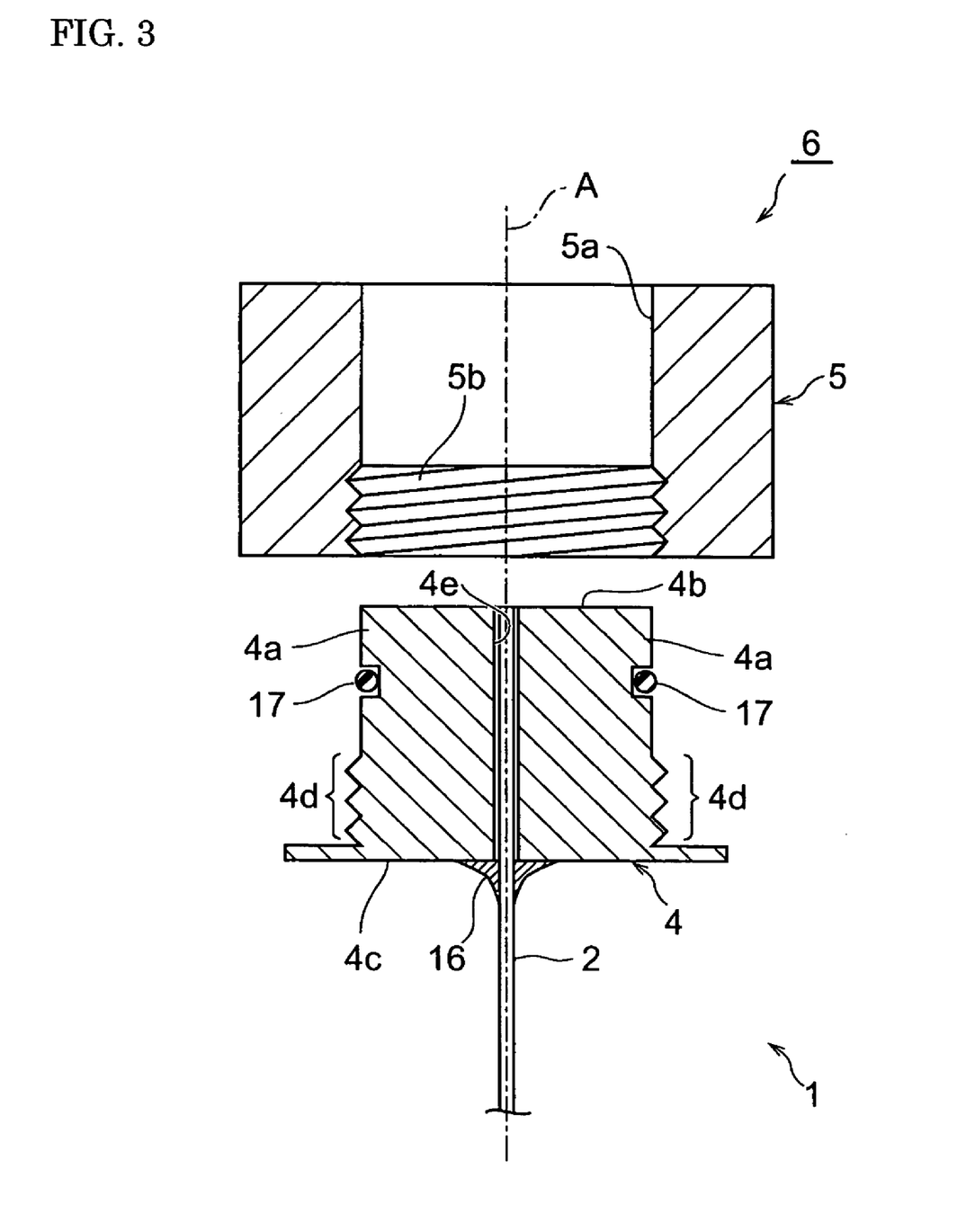
FIG. 3 is a sectional view showing an optical coupling set according to the embodiment of the present invention.

FIG. 3 is a sectional view showing the optical coupling set 6 according to the present embodiment. With reference to FIG. 3, the optical coupling set 6 includes the optical fiber connector cord 1 and the receptacle 5. The optical fiber connector cord 1 includes the optical fiber 2 and the plug 4.

The plug 4 is made of, for example, ceramic or metal, and has a columnar shape with an outer peripheral surface 4a and end faces 4b and 4c. A portion of the outer peripheral surface 4a of the plug 4 is provided with a plug thread portion 4d. The plug 4 has a fiber hole 4e extending therethrough from the end face 4b to the end face 4c, and the optical fiber 2 is inserted through the fiber hole 4e. A gap between the optical fiber 2 and the plug 4 is sealed with low melting-point glass 16, which corresponds to the second sealing member in the present embodiment. The low melting-point glass 16 is tightly applied to the end face 4c of the plug 4 and the outer peripheral surface of the optical fiber 2. In addition, the low melting-point glass 16 fixes the optical fiber 2 and the plug 4 to each other.

An O-ring 17 is provided on the outer peripheral surface 4a of the plug 4. More specifically, a groove is formed in the outer peripheral surface 4a of the plug 4 along the circumference thereof, and the O-ring 17 is disposed in the groove. The O-ring 17 corresponds to the first sealing member in the present embodiment, and seals the gap between the plug 4 and the receptacle 5 along the outer periphery of the plug 4. The O-ring 17 is constructed by, for example, forming silicone rubber or fluororubber in a ring shape.

The receptacle 5 is made of, for example, ceramic or metal, and has a cylindrical shape with an inner peripheral surface 5a. The diameter of the inner peripheral surface 5a of the receptacle 5 is set in accordance with the diameter of the outer peripheral surface 4a of the plug 4, and the plug 4 and the receptacle 5 can be detachably fitted to each other. A portion of the inner peripheral surface 5a of the receptacle 5 is provided with a receptacle thread portion 5b which matches with the plug thread portion 4d on the plug 4. When the plug 4 and the receptacle 5 are fitted to each other, the plug thread portion 4d and the receptacle thread portion 5b are caused to match with each other so as to fix the plug 4 and the receptacle 5 to each other.

The optical fiber connector cord 1 and the optical coupling set 6 according to the present embodiment has the following advantages. That is, in the optical fiber connector cord 1 and the optical coupling set 6 according to the present embodiment, the gap between the plug 4 and the receptacle 5 which are fitted to each other is sealed by the O-ring 17. In addition, the gap between the optical fiber 2 and the plug 4 is sealed by the low melting-point glass 16. Accordingly, the holes in the optical fiber 2 are effectively prevented from communicating with the atmosphere and the optical fiber connector cord 1 can be easily attached to or detached from the receptacle 5 fixed to the optical apparatus 50.

In addition, according to the present embodiment, since the holes in the optical fiber 2 are evacuated to vacuum or filled with at least one of the gasses G1 to G3, the absorption loss is reduced when the laser beam L propagates through the holes. Accordingly, light in the 2.76-μm band and 1.38-μm band, which is absorbed by water vapor, and vacuum ultraviolet light, which is absorbed by oxygen molecules, can propagate with low loss. In addition, if, for example, hydrogen is injected into the holes, defects existing in the boundaries between glass and the holes in the optical fiber 2 can be terminated, and absorption due to the defects can be reduced.

The optical fiber according to the present embodiment may be any one of the optical fibers 21, 22, and 23 shown in FIGS. 2A to 2C.

In addition, in the case in which the chamber 8 and the holes in the optical fiber 2 are filled with at least one of the gasses G1 to G3, the total pressure of the gasses thus filled is preferably set higher than the atmospheric pressure. Accordingly, the atmosphere is more effectively prevented from entering the holes in the optical fiber 2.

Preferably, the first sealing member for sealing the gap between the plug 4 and the receptacle 5 includes at least one O-ring, as in the embodiment. In such a case, the gap between the plug 4 and the receptacle 5 can be easily and reliably sealed. Although only one O-ring is provided in the embodiment, a plurality of O-rings are preferably provided on the outer peripheral surface 4a of the plug 4 since the sealing effect further increases in such a case.

In addition, the second sealing member for sealing the gap between the optical fiber 2 and the plug 4 preferably includes at least one of low melting-point glass, adhesive, and solder, as in the embodiment. In such a case, the gap between the optical fiber 2 and the plug 4 can be easily and reliably sealed, and the second sealing member serves an additional function of bonding the plug 4 and the optical fiber 2 together, thereby simplifying the structure. Although the low melting-point glass 16 is used as the second sealing member in the embodiment, the second sealing member is not limited to this. For example, adhesive and solder may also be used as the second sealing member.

In addition, preferably, the plug 4 has the plug thread portion 4d for engaging with the receptacle 5 and the receptacle 5 has the receptacle thread portion 5b which matches with the plug thread portion 4d, as in the embodiment. Accordingly, the plug 4 and the receptacle 5 can easily be attached to or detached from each other.

First Modification

Figure 4:
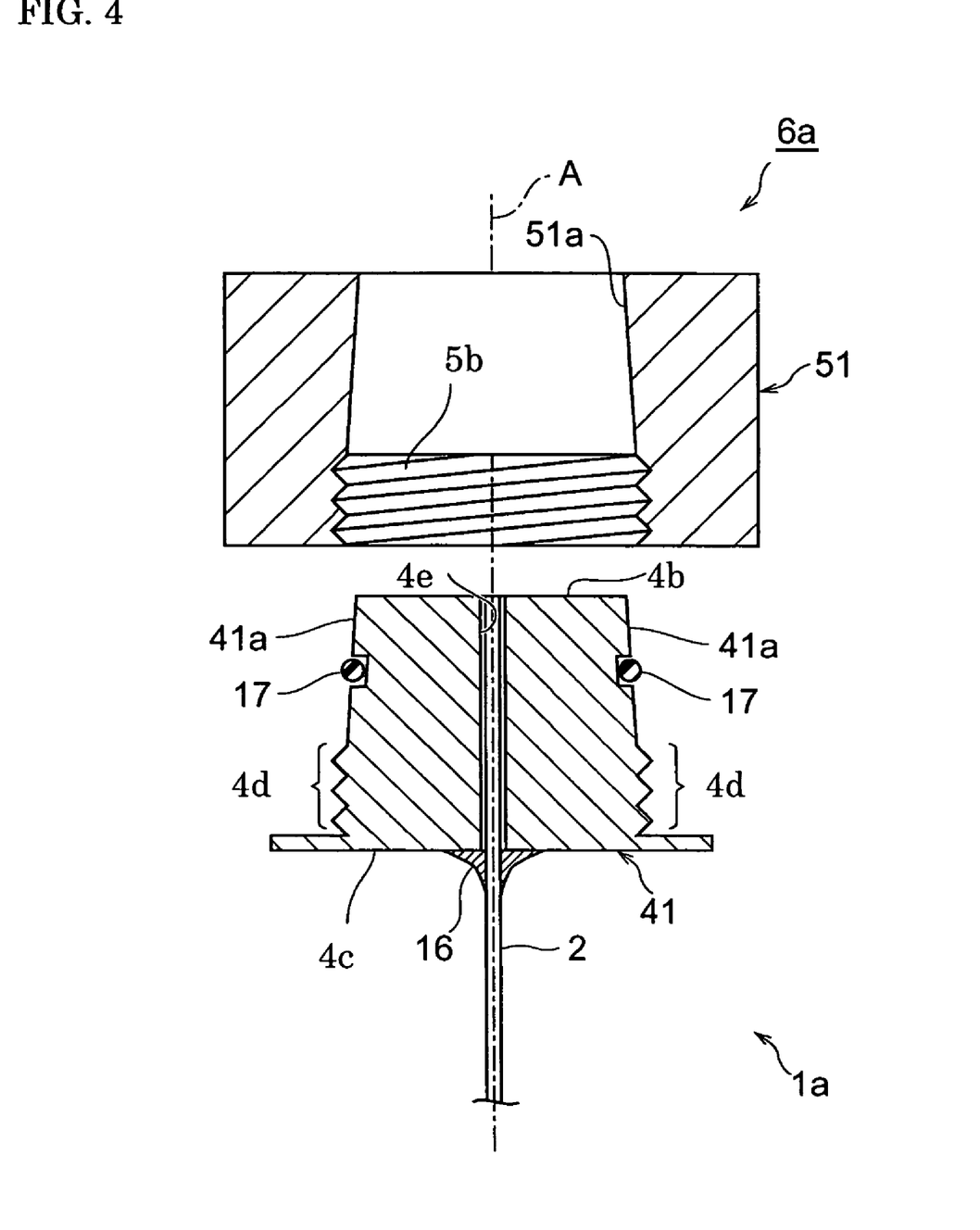
FIG. 4 is a sectional view showing a first modification of the optical coupling set.

FIG. 4 is a sectional view showing a first modification of the optical coupling set. With reference to FIG. 4, an optical coupling set 6a includes an optical fiber connector cord 1a and a receptacle 51. The optical fiber connector cord 1a includes an optical fiber 2 and a plug 41.

The plug 41 has a columnar shape with an outer peripheral surface 41a and end faces 4b and 4c. In the first modification, a portion of the outer peripheral surface 41a of the plug 41 is tapered. More specifically, a portion of the outer peripheral surface 41a excluding a plug thread portion 4d is formed such that the outer diameter at a position near the end face 4b is smaller than that at a position near the end face 4c.

The receptacle 51 has a cylindrical shape with an inner peripheral surface 51a. In the first modification, the inner peripheral surface 51a of the receptacle 51 is tapered in accordance with the shape of the outer peripheral surface 41a of the plug 41. More specifically, the inner peripheral surface 51a is formed such that the inner diameter at a position near the side from which the plug 41 is inserted is larger than that at the opposite side.

In the optical fiber connector cord 1a and the optical coupling set 6a, as in the case of the optical fiber connector cord 1 and the optical coupling set 6, the holes in the optical fiber 2 are effectively prevented from communicating with the atmosphere and the optical fiber connector cord 1a can easily be attached to or detached from the receptacle 51.

Preferably, at least a portion of the outer peripheral surface 41a of the plug 41 is tapered, as in the first modification. In such a case, the plug 41 can easily be inserted into the receptacle 51. In addition, since the gap between the plug 41 and the receptacle 51 is reduced as the plug 41 is inserted deeper into the receptacle 51, the first sealing member (O-ring 17) can effectively seal the gap between the plug 41 and the receptacle 51. In addition, if the pressure in the holes in the optical fiber 2 is maintained at a negative pressure, the receptacle 51 and the plug 41 pull each other. Accordingly, the gap between the plug 41 and the receptacle 51 can be more effectively sealed due to the tapered portion of the outer peripheral surface 41a. Although only a portion of the outer peripheral surface 41a of the plug 41 is tapered in the first modification, the entire region of the outer peripheral surface 41a may also be tapered.

Second Modification

Figure 5:
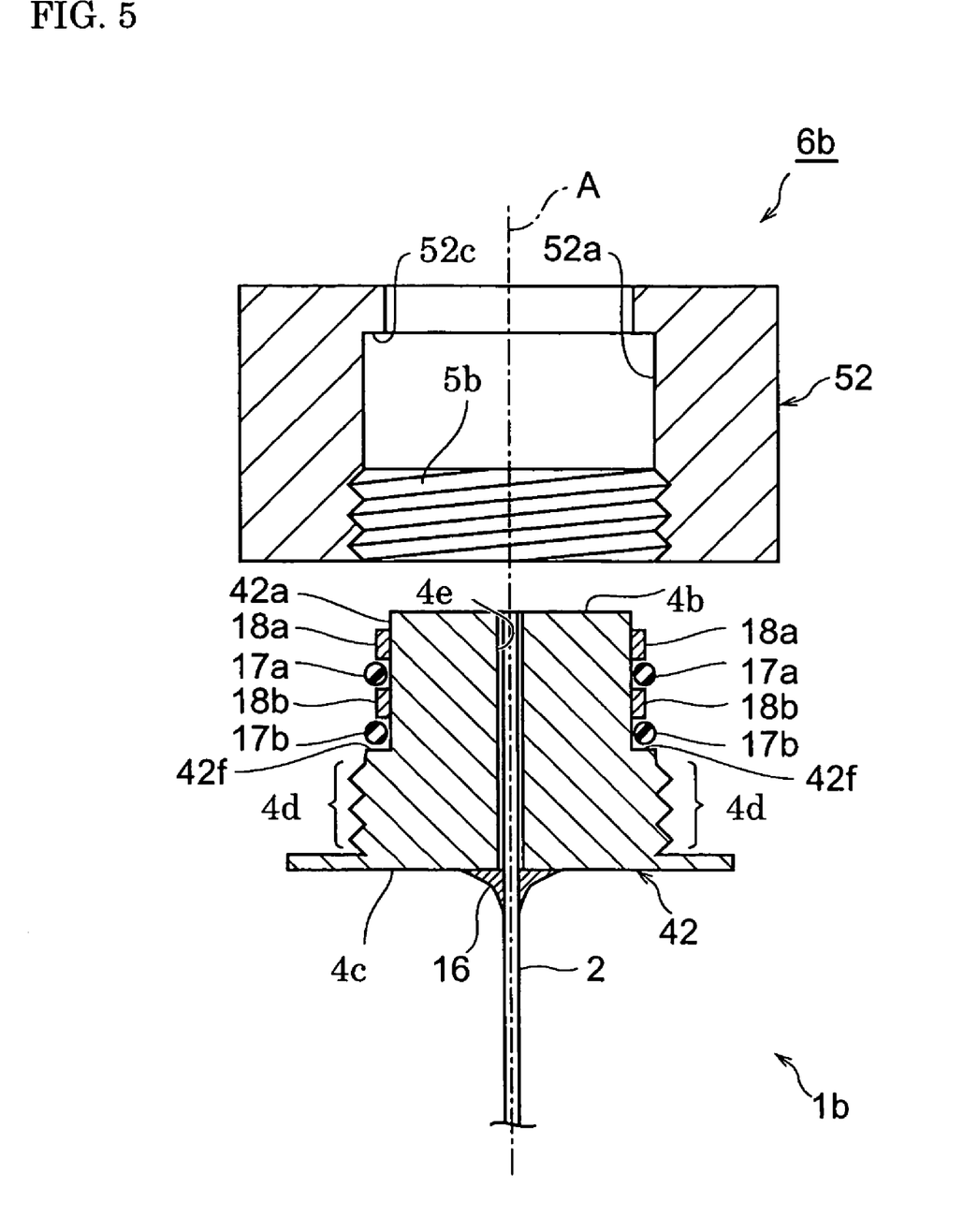
FIG. 5 is a sectional view showing a second modification of the optical coupling set.

FIG. 5 is a sectional view showing a second modification of the optical coupling set. With reference to FIG. 5, an optical coupling set 6b includes an optical fiber connector cord 1b and a receptacle 52. The optical fiber connector cord 1b includes an optical fiber 2 and a plug 42.

The plug 42 has a columnar shape with an outer peripheral surface 42a and end faces 4b and 4c. Two O-rings 17a and 17b which correspond to the first sealing and seal the gap between the plug 42 and the receptacle 52 along the outer periphery of the plug 42 are provided on the outer peripheral surface 42a. In the second modification, unlike the above-described embodiment, no groove is formed in the outer peripheral surface 42a of the plug 42, and the outer peripheral surface 42a on which the O-rings 17a and 17b are provided is flat. The O-rings 17a and 17b according to the second modification may be made of, for example, an elastic material such as silicone rubber and fluororubber.

In addition, two ring-shaped members 18a and 18b are provided on the outer peripheral surface 42a of the plug 42. The O-rings 17a and 17b and the ring-shaped members 18a and 18b are arranged in the order of the ring-shaped member 18a, the O-ring 17a, the ring-shaped member 18b, and the O-ring 17b from the position near the end face 4b. More specifically, the ring-shaped member 18a is positioned closer to an end of the optical fiber 2 than the O-ring 17a, and the ring-shaped member 18b is positioned closer to the end of the optical fiber 2 than the O-ring 17b. The ring-shaped members 18a and 18b are not fixed to the plug 42 and are slidable along the outer peripheral surface 42a. In addition, the outer peripheral surface 42a of the plug 42 has a step 42f for fixing the position of the O-ring 17b, and the O-ring 17b is positioned between the ring-shaped member 18b and the step 42f.

The receptacle 52 has a cylindrical shape with an inner peripheral surface 52a. In the second modification, the inner peripheral surface 52a of the receptacle 52 has a face 52c. This face 52c comes into contact with the ring-shaped member 18a in the state in which the plug 42 and the receptacle 52 are fitted to each other. More specifically, the face 52c lies in a plane perpendicular to the axial direction of the cylindrical receptacle 52, and faces a side surface of the ring-shaped member 18a.

In the optical coupling set 6b, as in the case of the optical coupling set 6, the holes in the optical fiber 2 are effectively prevented from communicating with the atmosphere and the optical fiber connector cord 1b can easily be attached to or detached from the receptacle 52.

Preferably, as in the optical coupling set 6b, the first sealing member (O-ring 17a) is elastic, the optical fiber connector cord further includes the slidable ring-shaped member positioned closer to the end of the optical fiber than the first sealing member on the outer peripheral surface of the plug 42, and the receptacle 52 has the face 52c which comes into contact with the ring-shaped member 18a in the state in which the receptacle 52 and the plug 42 are fitted to each other. In such a case, when the plug 42 and the receptacle 52 are fitted to each other, the face 52c of the receptacle 52 pushes the side of the elastic first sealing member (O-ring 17a) via the ring-shaped member 18a. In addition, the face 52c pushes the side of the O-ring 17b via the ring-shaped member 18b. Accordingly, the O-rings 17a and 17b deform outward and the pressing force between the first sealing member (O-rings 17a and 17b) and the receptacle 52 is increased when the plug 42 and the receptacle 52 are fitted to each other, and the gap between the plug 42 and the receptacle 52 is more effectively sealed.

Third Modification

Figure 6:
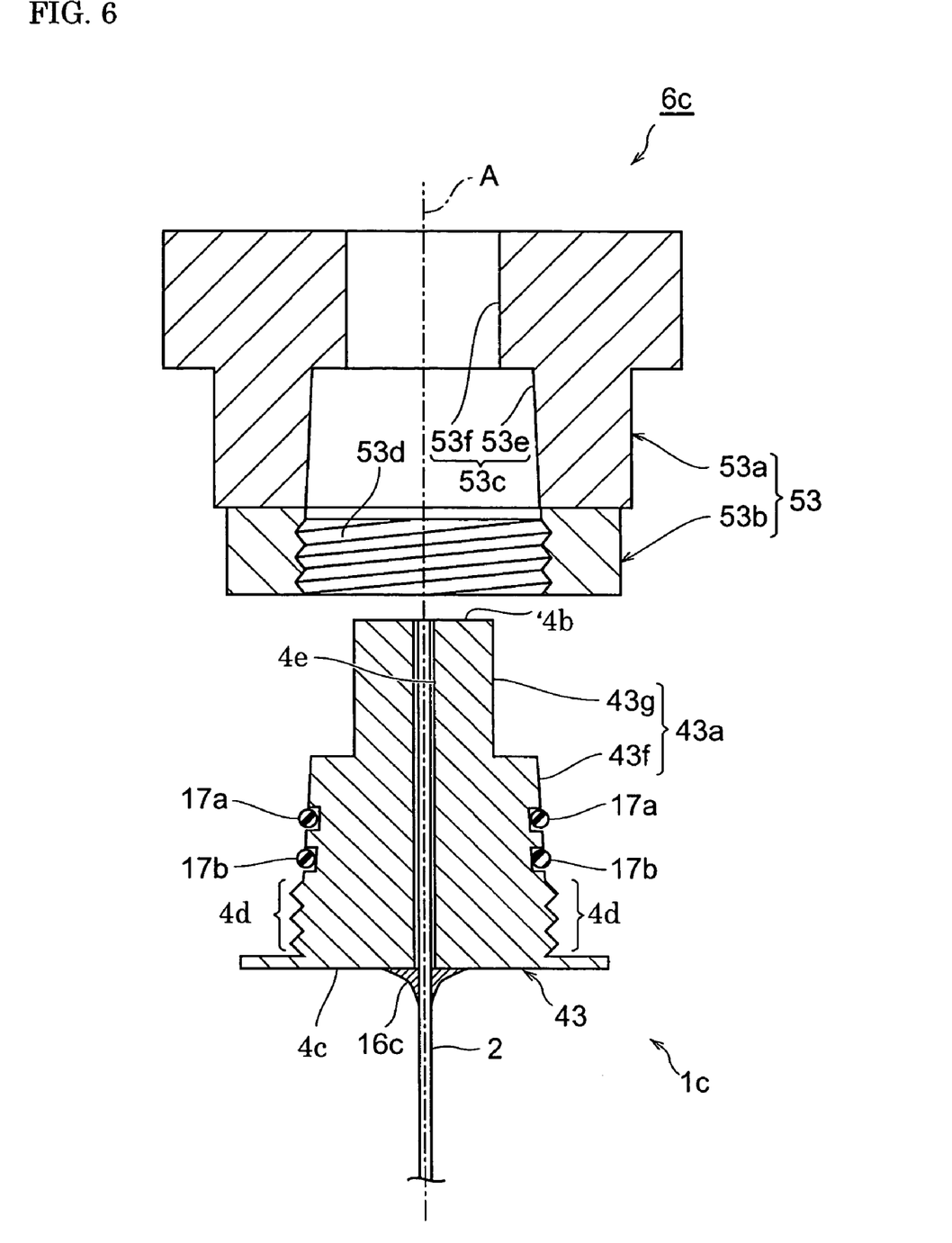
FIG. 6 is a sectional view showing a third modification of the optical coupling set.

FIG. 6 is a sectional view showing a third modification of the optical coupling set. With reference to FIG. 6, an optical coupling set 6c includes an optical fiber connector cord 1c and a receptacle 53. The optical fiber connector cord 1c includes an optical fiber 2 and a plug 43. The structure of the optical fiber 2 is similar to that in the above-described embodiment.

The plug 43 has a substantially columnar shape with an outer peripheral surface 43a and end faces 4b and 4c. In the third modification, the outer peripheral surface 43a of the plug 43 includes a first surface 43f and a second surface 43g. The second surface 43g is positioned closer to the end face 4b (that is, closer to an end of the optical fiber 2) than the first surface 43f. The outer diameter of the second surface 43g is smaller than that of the first surface 43f. In addition, a portion of the second surface 43g adjoining the end face 4b is chamfered.

Similar to the outer peripheral surface 41a of the plug 41, the first surface 43f is tapered. In addition, O-rings 17a and 17b are provided on the first surface 43f. More specifically, two grooves are formed in the first surface 43f along the circumference thereof, and the O-rings 17a and 17b are disposed in their respective grooves.

The receptacle 53 includes a main portion 53a and a fixing portion 53b. The main portion 53a has a cylindrical shape with an inner peripheral surface 53c. In the third modification, the inner peripheral surface 53c of the main portion 53a includes a third surface 53e and a fourth surface 53f. In the state in which the plug 43 and the receptacle 53 are fitted to each other, the third surface 53e faces the first surface 43f of the plug 43 and the fourth surface 53f faces the second surface 43g of the plug 43. More specifically, a portion of the plug 43 having the first surface 43f as the outer peripheral surface is fitted to a hole in the main portion 53a having the third surface 53e as the inner surface. In addition, a portion of the plug 43 having the second surface 43g as the outer peripheral surface is fitted to a hole in the main portion 53a having the fourth surface 53f as the peripheral surface.

The first to fourth surfaces are formed such that the gap between the second surface 43g and the fourth surface 53f is smaller than the gap between the first surface 43f and the third surface 53e. More specifically, the first to fourth surfaces are formed such that the difference between the outer diameter of the second surface 43g and the inner diameter of the fourth surface 53f is smaller than the difference between the outer diameter of the first surface 43f and the inner diameter of the third surface 53e. In addition, similar to the inner peripheral surface 51a of the receptacle 51, the third surface 53e of the main portion 53a is tapered in accordance with the shape of the first surface 43f of the plug 43.

The fixing portion 53b is provided at one end of the cylindrical main portion 53a at which the plug 43 is inserted. The fixing portion 53b has a cylindrical shape, and a central axis of the fixing portion 53b coincides with a central axis of the main portion 53a. A receptacle thread portion 53d which matches with a plug thread portion 4d on the plug 43 is formed in an inner peripheral surface of the fixing portion 53b. In addition, the fixing portion 53b is supported such that it can rotate around the central axis relative to the main portion 53a.

In the optical coupling set 6c, as in the case of the optical coupling set 6, the holes in the optical fiber 2 are effectively prevented from communicating with the atmosphere and the optical fiber connector cord 1c can easily be attached to or detached from the receptacle 53.

As in the case of the optical coupling set 6c, the outer peripheral surface of the plug includes the first surface 43f, on which the first sealing member is provided, and the second surface 43g which is positioned closer to the end of the optical fiber than the first surface 43f. The inner peripheral surface of the receptacle includes the third surface 53e and the fourth surface 53f, which respectively correspond to the first surface 43f and the second surface 43g of the plug. Preferably, the gap between the second surface 43g of the plug and the fourth surface 53f of the receptacle is smaller than the gap between the first surface 43f of the plug and the third surface 53e of the receptacle in the state in which the plug and the receptacle are fitted to each other. With such structure, the gap between the first surface 43f and the third surface 53e can reliably be sealed by the first sealing member (O-rings 17a and 17b) and the central axes of the plug 43 and the receptacle 53 can precisely be positioned relative to each other by the second surface 43g and the fourth surface 53f having a small gap therebetween (in other words, an optical axis A of the optical fiber 2 can precisely be positioned). Furthermore, in the third modification, it is unnecessary to rotate the plug 43, and only the fixing portion 53b is rotated, when the plug 43 is fitted to the receptacle 53. Accordingly, it is possible to prevent the optical fiber 2 from being twisted in the coupling process.

Fourth Modification

Figure 7:
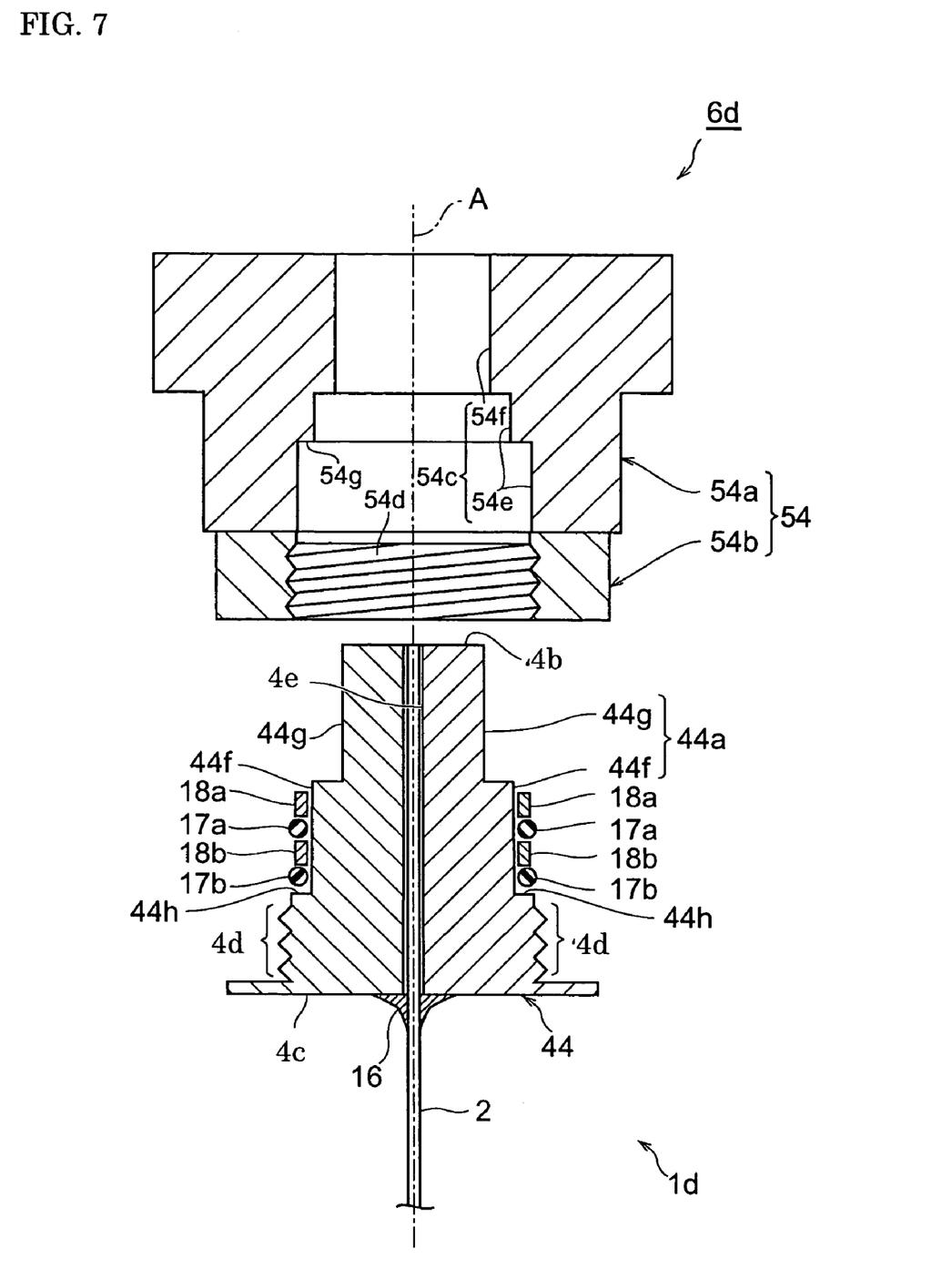
FIG. 7 is a sectional view showing a fourth modification of the optical coupling set.

FIG. 7 is a sectional view showing a fourth modification of the optical coupling set. With reference to FIG. 7, an optical coupling set 6d includes an optical fiber connector cord 1d and a receptacle 54. The optical fiber connector cord 1d includes an optical fiber 2 and a plug 44. The structure of the optical fiber 2 is similar to that in the above-described embodiment.

The plug 44 has a substantially columnar shape with an outer peripheral surface 44a and end faces 4b and 4c. In the fourth modification, the outer peripheral surface 44a of the plug 44 includes a first surface 44f and a second surface 44g. The second surface 44g is positioned closer to the end face 4b (that is, closer to an end of the optical fiber 2) than the first surface 44f. The outer diameter of the second surface 44g is smaller than that of the first surface 44f.

As in the case of the above-described second modification, a ring-shaped member 18a, an O-ring 17a, a ring-shaped member 18b, and an O-ring 17b are provided on the first surface 44f in that order from the end face 4b. The ring-shaped members 18a and 18b are slidable relative to the plug 44. The O-ring 17b is positioned between the ring-shaped member 18b and a step 44h formed on the first surface 44f.

The receptacle 54 includes a main portion 54a and a fixing portion 54b. The main portion 54a has a cylindrical shape with an inner peripheral surface 54c. In the fourth modification, the inner peripheral surface 54c of the main portion 54a includes a third surface 54e and a fourth surface 54f. The third surface 54e of the main portion 54a includes a face 54g. The face 54g comes into contact with the ring-shaped member 18a when the plug 44 and the receptacle 54 are fitted to each other.

In the fourth modification, the relationships between the first and second surfaces 44f and 44g of the plug 44 and the third and fourth surfaces 54e and 54f of the main portion 54a are similar to the relationships between the first and second surfaces 43f and 43g of the plug 43 and the third and fourth surfaces 53e and 53f of the main portion 53a in the third modification. In addition, the structure of the fixing portion 54b is similar to the structure of the fixing portion 53b in the third modification, including a receptacle thread portion 54d formed therein.

In the optical coupling set 6d, as in the case of the optical coupling set 6, the holes in the optical fiber 2 can effectively be prevented from communicating with the atmosphere and the optical fiber connector cord 1d can easily be attached to or detached from the receptacle 54.

With the optical coupling set 6d, as in the case of the third modification, the gap between the first surface 44f and the third surface 54e can reliably be sealed by the O-rings 17a and 17b and the central axes of the plug 44 and the receptacle 54 can precisely be positioned relative to each other by the second surface 44g and the fourth surface 54f having a small gap therebetween. Furthermore, with the optical coupling set 6d, as in the case of the second modification, the pressing force between the receptacle 54 and the O-rings 17a and 17b increases when the plug 44 and the receptacle 54 are fitted to each other and the gap between the plug 44 and the receptacle 54 can more effectively be sealed. Also, in the fourth modification, as in the third modification, it is unnecessary to rotate the plug 44, and only the fixing portion 54b is rotated, when the plug 44 is fastened to the receptacle 54. Accordingly, it is possible to prevent the optical fiber 2 from being twisted in the coupling process.

In the fourth modification, the first surface 44f and the second surface 44g of the plug 44 may also be formed at the same level of surface. In other words, the outer diameter of the first surface 44f and that of the second surface 44g may be the same. In such a case, however, there is a risk that the second surface 44g will be damaged when the ring-shaped members 18a and 18b are attached or detached. Accordingly, the outer diameter of the second surface 44g is preferably smaller than that of the first surface 44f, as in the fourth modification.

Fifth Modification

Figure 8:
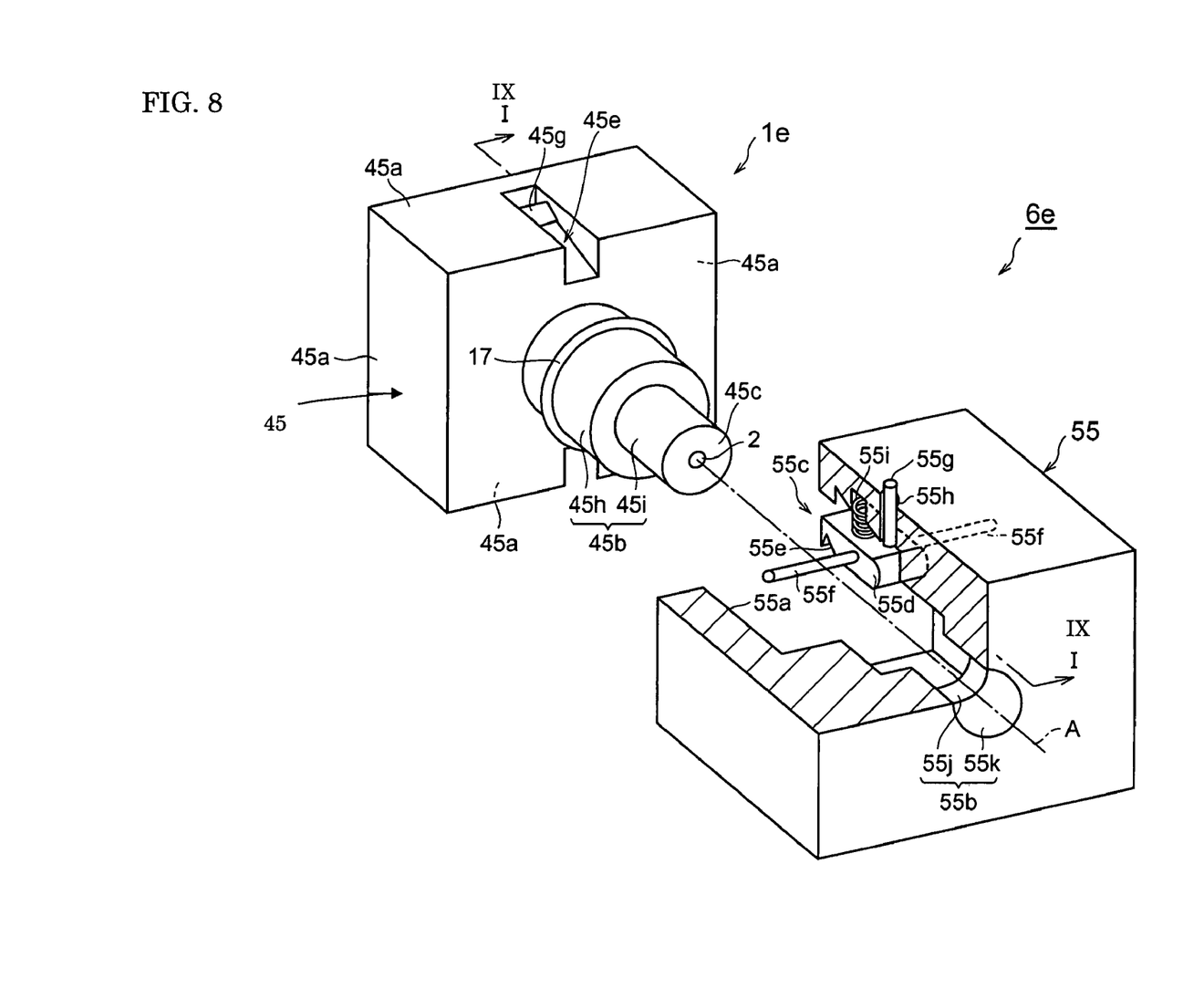
FIG. 8 is a partially cutout perspective view showing a fifth modification of the optical coupling set.
Figure 9:
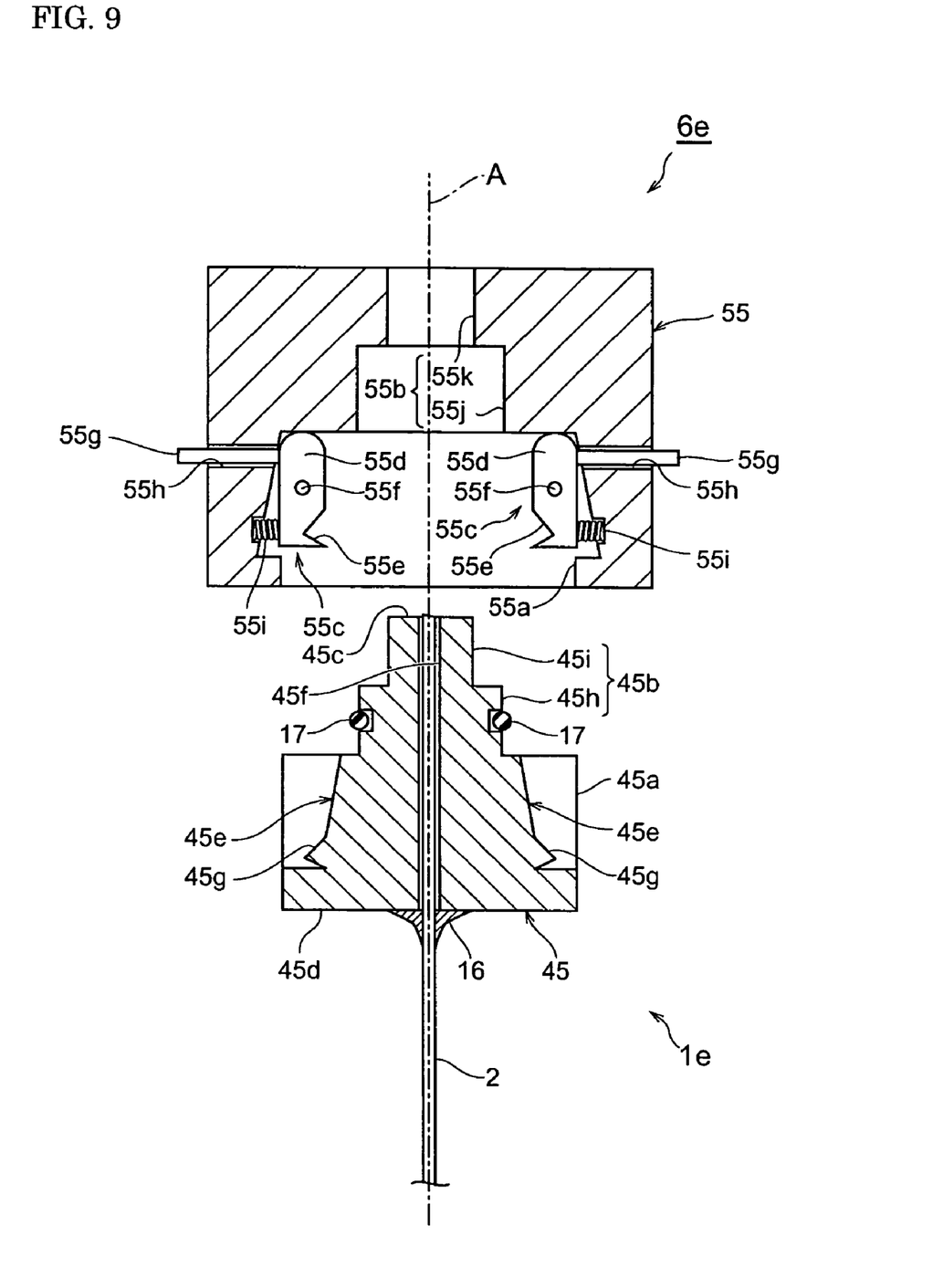
FIG. 9 is a sectional view showing the fifth modification of the optical coupling set taken along line IX—IX.

FIG. 8 is a partially cutout perspective view showing a fifth modification of the optical coupling set. FIG. 9 is a sectional view showing the fifth modification of the optical coupling set taken along line IX—IX. With reference to FIGS. 8 and 9, an optical coupling set 6e includes an optical fiber connector cord 1e and a receptacle 55. The optical fiber connector cord 1e includes an optical fiber 2 and a plug 45. The structure of the optical fiber 2 is similar to that in the above-described embodiment.

The plug 45 includes outer peripheral surfaces 45a and 45b. The outer peripheral surface 45b is positioned closer to an end face 45c (that is, closer to an end of the optical fiber 2) than the outer peripheral surface 45a. A portion of the plug 45 surrounded by the outer peripheral surface 45b has a cylindrical shape with a central axis which coincides with an optical axis A of the optical fiber 2. The outer peripheral surface 45b of the plug 45 includes a first surface 45h and a second surface 45i. The second surface 45i is positioned closer to the end face 45c than the first surface 45h. The outer diameter of the second surface 45i is smaller than the outer diameter of the first surface 45h. In addition, a portion of the plug 45 surrounded by the outer peripheral surface 45a has a rectangular shape in a cross section perpendicular to the optical axis A. More specifically, a portion of the plug 45 surrounded by the outer peripheral surface 45a has a rectangular solid shape.

In the outer peripheral surface 45a of the plug 45, two opposite faces include engaging means such as plug engagers 45e. The plug engagers 45e have projections 45g, and notches 55e of receptacle engagers, which will be described below, engage with the respective projections 45g so as to fix the plug 45 and the receptacle 55 to each other.

In addition, the plug 45 has a fiber hole 45f through which the optical fiber 2 is inserted. A gap between the optical fiber 2 and the plug 45 is sealed with low melting-point glass 16, and the low melting-point glass 16 fixes the optical fiber 2 and the plug 45 to each other. An O-ring 17 for sealing a gap between the plug 45 and the receptacle 55 along the outer periphery of the plug 45 is provided on the first surface 45h of the plug 45.

The receptacle 55 includes inner peripheral surfaces 55a and 55b. The inner peripheral surface 55b includes a third surface 55j and a fourth surface 55k. In the state in which the plug 45 and the receptacle 55 are fitted to each other, the portion of the plug 45 surrounded by the outer peripheral surface 45a is fitted to a hole defined by the inner peripheral surface 55a of the receptacle 55. Likewise, the portion of the plug 45 surrounded by the outer peripheral surface 45b is fitted to a hole defined by the inner peripheral surface 55b of the receptacle 55.

In the fifth modification, the relationships between the first and second surfaces 45h and 45i of the plug 45 and the third and fourth surfaces 55j and 55k of the receptacle 55 are similar to the relationships between the first and second surfaces 43f and 43g of the plug 43 and the third and fourth surfaces 53e and 53f of the main portion 53a in the third modification.

In addition, the receptacle 55 includes engaging means such as the receptacle engagers 55c. Each of the receptacle engagers 55c includes a moving part 55d, a compression spring 55i, a latch-disengaging switch 55g, and a moving shaft 55f. The moving shafts 55f are rotatably supported by the receptacle 55 such that the moving shafts 55f extend perpendicular to the central axis of the receptacle 55, and are fixed to the respective moving parts 55d. The moving parts 55d tilt around the respective moving shafts 55f. The moving parts 55d have the notches 55e which engage with the projections 45g of the plug engagers 45e when the plug 45 and the receptacle 55 are fitted to each other.

Each of the compression springs 55i is provided between an inner surface of the receptacle and a side of the corresponding moving portion 55d opposite from the notch 55e. More specifically, when the plug 45 and the receptacle 55 are fitted to each other, the moving portions 55d gradually tilt along inclined surfaces of the plug engagers 45e. When the notches 55e in the moving portions 55d reach the projections 45g of the respective plug engagers 45e, the moving portions 55d return from the tilted state due to the elastic force of the compression springs 55i, and thereby the notches 55e engage with the respective projections 45g.

In addition, each of the latch-disengaging switches 55g is provided on the side of the corresponding moving portion 55d which faces the receptacle 55 at an end opposite to the compression spring 55i across the moving shaft 55f. The latch-disengaging switches 55g extend out from the receptacle 55 through holes 55h formed in the receptacle 55. When the latch-disengaging switches 55g extending out from the receptacle 55 are pushed inward, the moving portions 55d move against the elastic force applied by the compression springs 55i and the notches 55e are disengaged from the projections 45g of the respective plug engagers 45e.

In the optical coupling set 6e, as in the case of the optical coupling set 6, the holes in the optical fiber 2 can effectively be prevented from communicating with the atmosphere and the optical fiber connector cord 1e can easily be attached to or detached from the receptacle 55.

Preferably, as in the optical coupling set 6e, at least either one of the plug 45 and the receptacle 55 is provided with a means for engaging with the other one of the plug 45 and the receptacle 55. With such structure, the plug 45 and the receptacle 55 can easily be fixed to each other simply by pushing the plug 45 into the receptacle 55. In the fifth modification, both of the plug 45 and the receptacle 55 have engaging means. However, only the plug 45 or the receptacle 55 may have the engaging means, provided that it can cause the plug 45 and the receptacle 55 to engage with each other.

The optical fiber connector cord and the optical coupling set according to the present invention are not limited to those of the above-described embodiment and modifications, and other various modifications are possible. For example, the first sealing member is not limited to the O-rings, and other various components may also be used provided that the gap between the plug and the receptacle is sealed. In addition, various kinds of materials may be used as the second sealing member provided that the gap between the optical fiber and the plug is sealed. In addition, the optical coupling set according to the present invention may be applied to various kinds of optical apparatuses.

The optical fiber connector cord and the optical coupling set according to the present invention may be applied to, for example, medical laser surgical knives. More specifically, a holey fiber may be used as an optical fiber for propagating a laser beam for a laser surgical knife, and one end of the holey fiber may be connected to the optical coupling set according to the present invention. In this case, compressed gas of dry nitrogen or the like that is harmless to the human body is discharged through the holes, so that droplets are prevented from adhering and burning on the other end of the optical fiber.

Another application of the optical fiber connector cord and the optical coupling set according to the present invention will be described below. It is known that transmission loss of an optical fiber for the ultraviolet range is decreased by forming a core of the optical fiber with fluoridated glass and performing a hydrotreating process. However, hydrogen in the optical fiber leaks out over time. Thus, by injecting hydrogen into holes of a holey fiber using the optical fiber connector cord according to the present invention, satisfactory ultraviolet transmission characteristics can be maintained for a long time.

While this invention has been described in connection with what is presently considered to be the most practical and preferred embodiment, the invention is not limited to the disclosed embodiment, but on the contrary, is intended to cover various modifications and equivalent arrangements included within the spirit and scope of the appended claims.

The entire disclosure of Japanese Patent Application No. 2004-126053 filed on Apr. 21, 2004 including specification, claims, drawings and summary are incorporated herein by reference in its entirety.

What is claimed is:

1. An optical fiber connector cord detachably fixable to a receptacle fixed to an optical apparatus, the optical fiber connector cord comprising:
    an optical fiber having at least one through hole which extends along an optical axis;
    a plug fittable into the receptacle, the plug having a fiber hole through which the optical fiber extends;
    a first sealing member provided on the outer peripheral surface of each plug so as to seal a gap along an outer circumference of the plug between the plug and the receptacle; and
    a second sealing member for sealing a gap along an outer circumference of the optical fiber between the optical fiber and the inner surface of the fiber hole.

2. An optical fiber connector cord according to claim 1, wherein
    the first sealing member comprises at least one O-ring.

3. An optical fiber connector cord according to claim 1, wherein
    the second sealing member comprises at least one of low melting-point glass, adhesive, and solder.

4. An optical fiber connector cord according to one of claims 1 to 3, wherein
    at least a portion of the outer peripheral surface is tapered.

5. An optical fiber connector cord according to one of claims 1 to 3, wherein
    the plug has a plug thread portion which matches with the receptacle.

6. An optical coupling set comprising an optical fiber connector cord and a receptacle fixed to an optical apparatus, wherein
    the optical fiber connector cord comprises an optical fiber having at least one through hole which extends along an optical axis, a plug having a fiber hole through which the optical fiber extends and being fittable into the receptacle, a first sealing member provided on the outer peripheral surface of the plug so as to seal a gap between the plug and the receptacle along an outer circumference of the plug; and a second sealing member for sealing a gap along an outer circumference of the optical fiber between the inner surface of the fiber hole and the optical fiber.

7. An optical coupling set according to claim 6, wherein
    at least either one of the plug and the receptacle is provided with means for engaging with the other one of the plug and the receptacle.

8. An optical coupling set according to claims 6 or 7, wherein the first sealing member is elastic,
    the optical fiber connector cord further includes a slidable ring-shaped member disposed at a position closer to an end of the optical fiber than the first sealing member on the outer peripheral surface of the plug, and
    the receptacle has a face that comes into contact with the ring-shaped member in a state in which the receptacle and the plug are fitted to each other.

9. An optical coupling set according to one of claims 6 or 7, wherein
    the outer peripheral surface of the plug includes a first surface on which the first sealing member is provided and a second surface positioned closer to an end of the optical fiber than the first surface,
    the inner peripheral surface of the receptacle includes a third surface and a fourth surface which correspond to the first surface and the second surface, respectively, of the plug, and
    a gap between the second surface of the plug and the fourth surface of the receptacle is smaller than a gap between the first surface of the plug and the third surface of the receptacle in a state in which the plug and the receptacle are fitted to each other.

* * * * *